US006999291B2

(12) United States Patent
Andarawis et al.

(10) Patent No.: US 6,999,291 B2
(45) Date of Patent: *Feb. 14, 2006

(54) METHOD AND APPARATUS FOR NODE ELECTRONICS UNIT ARCHITECTURE

(75) Inventors: Emad Andarawis Andarawis, Ballston Lake, NY (US); Daniel White Sexton, Niskayuna, NY (US); Austars Raymond Schnore, Jr., Scotia, NY (US); Ertugrul Berkcan, Clifton Park, NY (US); Changting Wang, Schenectady, NY (US); Samantha Rao, Indira Nagar Bangalore (IN); Ramakrishna Rao, Karnataka (IN); Eugene Joseph Orlowski, Jr., Scotia, NY (US); Somashekhar Basavaraj, Bagalore (IN); Rahul Gore, Maharashtra (IN); Marc Robert Pearlman, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 458 days.

This patent is subject to a terminal disclaimer.

(21) Appl. No.: 10/373,641

(22) Filed: Feb. 25, 2003

(65) Prior Publication Data

US 2003/0222509 A1    Dec. 4, 2003

Related U.S. Application Data

(60) Provisional application No. 60/438,159, filed on Jan. 6, 2003, provisional application No. 60/359,544, filed on Feb. 25, 2002.

(51) Int. Cl.
*H02H 3/00*    (2006.01)

(52) U.S. Cl. ...................................................... 361/64

(58) Field of Classification Search ............... 361/64
See application file for complete search history.

(56) References Cited

U.S. PATENT DOCUMENTS

| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |

(Continued)

FOREIGN PATENT DOCUMENTS

EP    0718948 A2    6/1996

(Continued)

OTHER PUBLICATIONS

Atanackovic D. et al. An Integrated Knowledge-Based Model For Power-System Planning IEEE Expert, IEEE Inc. New York, Jul. 1997, pp. 65-71.

*Primary Examiner*—Stephen W. Jackson
(74) *Attorney, Agent, or Firm*—Ohlandt, Greeley, Ruggiero & Perle, L.L.P.

(57) ABSTRACT

A method and apparatus for operating a power distribution system circuit breaker is provided. The circuit breaker includes an associated node electronics unit wherein a node electronics unit redundancy requirement is predetermined. The method includes monitoring electrical system parameters associated with the circuit breaker with the node electronics unit, communicating the electrical system parameters over a digital network to at least one central control processing unit, receiving commands and actions from the at least one central control processing unit over the digital network, determining circuit breaker actuation commands based at least partially on the received commands and actions, and operating the circuit breaker based on the circuit breaker actuation commands.

41 Claims, 6 Drawing Sheets

U.S. PATENT DOCUMENTS

| | | |
|---|---|---|
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |

| | | |
|---|---|---|
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 | 9/2001 | Alexander et al. |
| 6,291,911 B1 | 9/2001 | Dunk et al. |
| 6,292,340 B1 | 9/2001 | O'Regan et al. |
| 6,292,717 B1 | 9/2001 | Alexander et al. |
| 6,292,901 B1 | 9/2001 | Lys et al. |
| 6,297,939 B1 | 10/2001 | Bilac et al. |
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Anderson |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 6,892,115 B1 * | 5/2005 | Berkcan et al. ............. 700/286 |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |

FOREIGN PATENT DOCUMENTS

| | | |
|---|---|---|
| EP | 0723325 A1 | 7/1996 |
| EP | 0949734 A2 | 10/1999 |

* cited by examiner

METHOD AND APPARATUS FOR NODE ELECTRONICS UNIT ARCHITECTURE

CROSS REFERENCE TO RELATED APPLICATIONS

This application is related to U.S. Patent Application No. 60/359,544 filed on Feb. 25, 2002 for "Integrated Protection, Monitoring, and Control" the content of which is incorporated in its entirety herein by reference. This application is also related to U.S. Patent Application No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for protecting, monitoring, and controlling the electrical switchgear.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear, which facilitates dividing the power into branch circuits, which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

BRIEF DESCRIPTION OF THE INVENTION

In one aspect, a method of operating a power distribution system circuit breaker including an associated node electronics unit is provided. The method includes monitoring electrical system parameters associated with the circuit breaker with the node electronics unit, communicating the electrical system parameters over a digital network to at least one central control processing unit (CCPU), receiving commands and actions from the at least one CCPU over the digital network; determining circuit breaker actuation commands based at least partially on the received commands and actions, and operating the circuit breaker based on the circuit breaker actuation commands.

In another aspect, a node electronics unit associated with a single circuit breaker is provided. The node electronics unit is for receiving circuit breaker commands for the associated circuit breaker from at least one CCPU and transmitting a circuit breaker actuation command to the associated circuit breaker. The node electronics unit includes at least one network communications interface for communicating with the at least one CCPU, at least one processor including a memory, a communication processor and a command interpreter wherein the processor is coupled to the network communications interface, a signal conditioner coupled to the processor wherein the signal conditioner receives electrical signals from a plurality of sensors including at least one of a circuit breaker load current sensor and a circuit breaker voltage sensor, the plurality of sensors are located off-board the circuit breaker and off-board the node electronics unit, a status input module coupled to the processor for receiving signals of the associated circuit breaker status from the associated circuit breaker, and an actuation power module coupled to the processor for supplying circuit breaker actuation commands to the associated circuit breaker.

A power distribution system is provided. The system includes at least one circuit breaker, a node electronics unit, and each node electronics unit associated with one of the at least one circuit breakers, each node electronics unit mounted remotely from the associated circuit breaker, and each node electronics unit is electrically coupled to the associated circuit breaker, a digital network communicatively coupled to each node electronics unit, and at least one central control unit communicatively coupled to the network, and the network configured to interconnect each node electronics unit and each of the at least one central control unit, and allow a plurality of communication transmissions between each node electronics unit and each of the at least one central control unit.

DETAILED DESCRIPTION OF THE INVENTION

Figure 1:
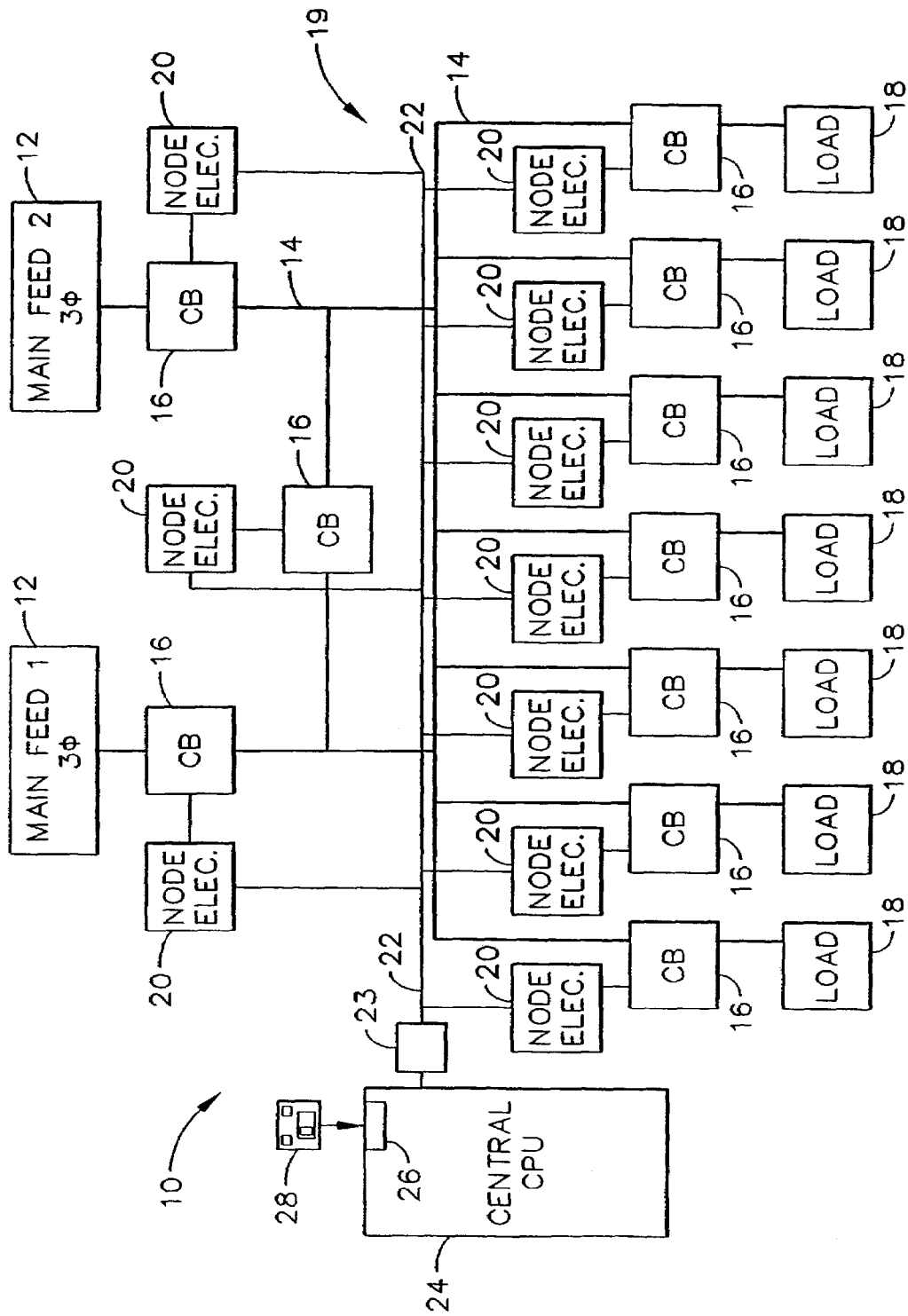
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
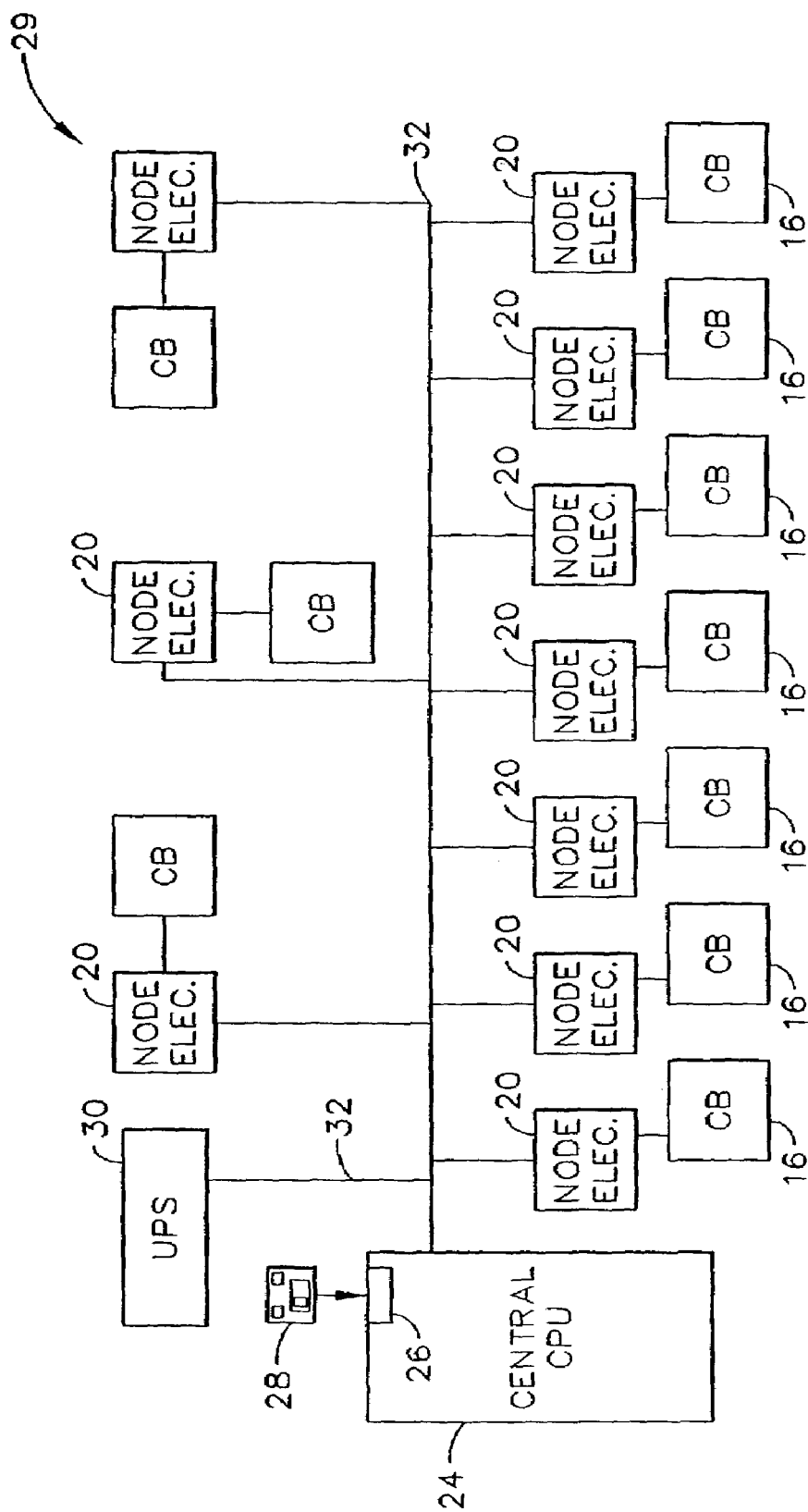
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
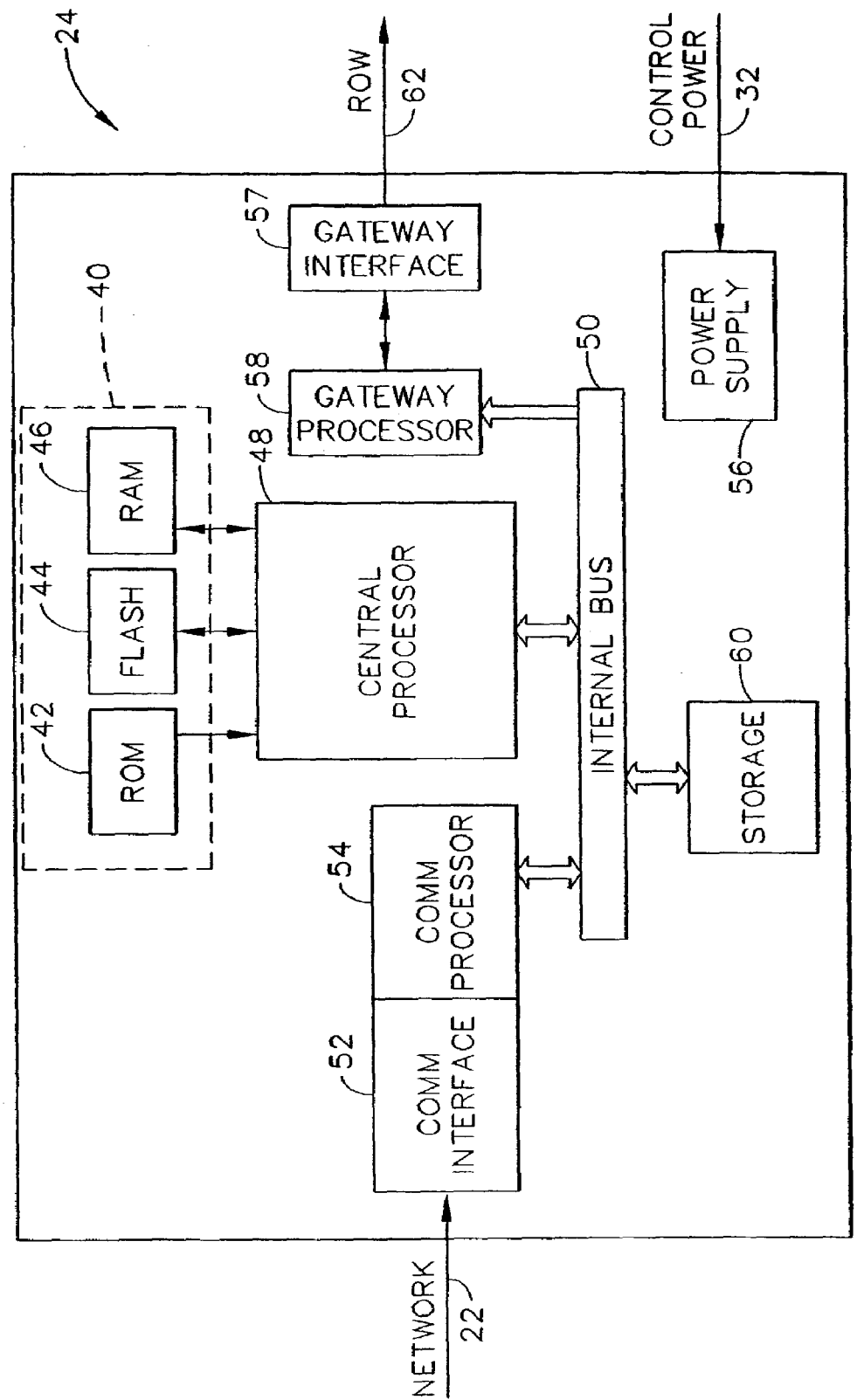
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronics unit 20 via CCPU 24 and digital network 22. In another embodiment, information sent from node electronics unit 20 is received at communication interface 52 and transmitted to Internet 62 via gateway interface 57.

Figure 4:
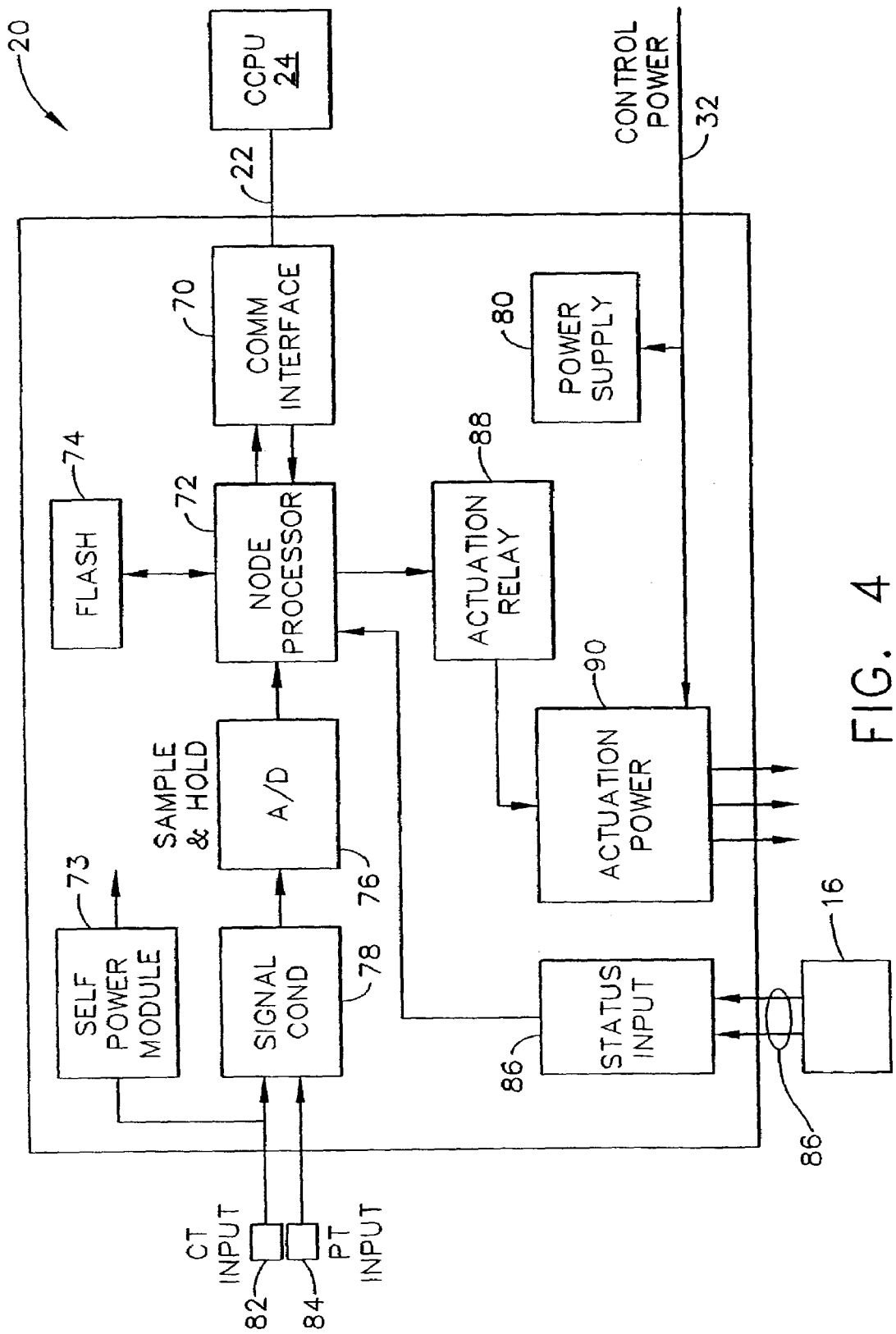
FIG. 4 is an exemplary schematic illustration of a node electronics unit that may used with the power distribution system shown in FIG. 1.

FIG. 4 is an exemplary schematic illustration of single node electronics unit 20. In the exemplary embodiment, node electronics unit 20 is a unitary device mounted remotely from CCPU 24. Additionally, node electronics unit 20 can be separate from but proximate to circuit breaker 16. Node electronics unit 20 includes a communications interface 70 that is coupled to digital network 22. In the exemplary embodiment, communication interface 70 communicates over network 22 using Fast Ethernet protocol having a data transfer rate of at least 100 Mbps (mega bytes per second). In another embodiment, the Fast Ethernet protocol has a data transfer rate of about 1 Gbps (giga bytes per second). In another embodiment, node electronics unit 20 includes a plurality of communication interfaces 70 that couple to an equal number of independent networks 22 which, in turn, each couple to independent CCPUs 24. Such an architecture provides a redundancy that facilitates operation of power distribution system 10. A number of independent, redundant communications interfaces 70, networks 22 and CCPUs 24 is determined by a predetermined redundancy requirement of a user. Each communication interface 70 couples electrically to a node processor 72 to transmit data received from a respective CCPU 24 to node processor 72 and to transmit data received from node processor 72 to respective CCPU 24. In an alternative embodiment, node electronics units 20 include a plurality of node processors 72. At least one of the plurality of node processors 72 may be a self-powered processor. A self-powered processor receives power from a self-power supply circuit 73. In an embodiment wherein a self-powered processor is used, the self powered-processor is configured to conserve electrical energy when power supply 80 is unable to supply the electrical requirements of the node electronics units 20. In such a case, self-powered processor 72 is configured for fast wakeup, i.e. an abbreviated initialization process when first powered. Self-powered processor 72 is additionally configured to modify its clock speed and processing to coordinate its power usage with power available through self-power supply circuit and power supply 80. Node processor 72 includes a memory, a communication processor and a command interpreter within. The clocks of each node processor 72 in the plurality of node electronics units 20 in power distribution system 10 are synchronized by a synchronization pulse received from at least one CCPU 24. Node electronics units 20 determines which synchronization signal received synchronizes the node processors 72.

Node processor 72 is electrically coupled to a memory device 74, such as, but not limited to a flash memory device, an analog digital (A/D) converter 76, and a signal conditioner 78. Node processor 72 is communicatively coupled to communications interface 70. Memory device 74 is also communicatively coupled to node processor 72 for exchanging data, and program instructions. In one embodiment, memory device 74 is a single device including a program area and a data area. In an alternative embodiment, memory 74 is a plurality of devices, each including an area for a program, data and configuration constant information. In an embodiment wherein a plurality of node processors 72 are used, memory 74 includes a separate device dedicated to each node processor 72 and a shared memory area accessible and modifiable by each node processor 72. Node processor 72 is electrically coupled to A/D converter 76 to receive digital signals representing analog signals received from signal conditioner 78. Analog signals from sensors located remotely from circuit breaker 16 and node electronics unit 20 monitor electrical parameters associated with respective circuit breaker 16. The analog signals are received by signal conditioner 78 from CT input 82 and PT input 84. CT input 82 is electrically coupled to an input CT and a burden resistor. Input current flowing through the burden resistor induces a voltage drop across the burden resistor that is proportional to the input current. The induced voltage is sensed at signal conditioner 78 input. Signal conditioner 78 includes a filtering circuit to improve a signal to noise ratio of the incoming signal, a gain circuit to amplify the incoming signal, a level adjustment circuit to shift the incoming signal to a pre-determined range, and an impedance match circuit to facilitate a signal transfer to A/D converter 76. In the exemplary embodiment, A/D converter 76 is a sample and hold type of A/D converter. The sample and hold feature facilitates synchronization of electrical parameter measurements in node electronics units 20. A/D converter 76 samples signal conditioner 78 output when commanded by node processor 72, which issues synchronization commands as directed by CCPU 24. In an exemplary embodiment, node electronics unit 20 is a printed circuit board and includes a power supply 80 to power a plurality of devices on the printed circuit board.

In one embodiment, node electronics unit 20 receives signals input from a plurality of devices, such as, but not limited to, a current transformer 82, and a potential transformer 84, and/or a status input device 86. Status input device 86 receives a plurality of status signals from circuit breaker 16, such as, but not limited to, an auxiliary switch status, and an operating spring charge switch status. In one embodiment, current transformer 82 includes a plurality of current transformers, each monitoring a different phase of a three phase power system, and at least one current transformer monitoring a neutral phase of the three phase power system. In another embodiment, potential transformer 84 includes a plurality of potential transformers, each monitoring a different phase of a three-phase power system. An actuation relay module 88 is communicatively coupled to node processor 72 and module 88 is also coupled to an actuation power module 90. Status input module and actuation power module 90 are electrically coupled to circuit breaker 16 through a standard wiring harness.

In one embodiment, node electronics unit 20 includes a second node processor 72 that executes a program code segment that determines local control and protection actions to be used to determine breaker commands when communications between node electronics unit 20 and CCPU 24 is lost. The second node processor is powered from an electrical source onboard the node electronics unit separate and independent from the control system power supply that supplies the other components of node electronics unit 20. In this embodiment, first node processor 72 is configured to execute a program code segment that controls all other functions of nod electronics unit 20, including, but, not limited to, communications functions performed by communications interface 70, input functions performed by signal conditioner 78, A/D 76, and status input 86, and output functions performed by actuation relay 88 and actuation power module 90. Second node processor 72 includes a memory separate and independent from memory unit 74.

In use, signals received from status input device 86, current transformer 82, and potential transformer 84, are conditioned by signal conditioner 78 and transmitted to A/D converter 76, where the analog signals are converted to digital signals for input to node processor 72. Node processor 72 executes software that is resident on memory 74. The software instructs node processor 72 to receive digital signals from A/D converter 76 and logical status signals from circuit breaker 16 through status input 86. Node processor 72 compares the input signals to parameters determined by software executing on node processor 72 and parameters in control and protective actions received from CCPU 24 through network 22 and communications interface 70. Node processor 72 determines local control and protective actions based on the input signals and the control and protective actions received from CCPU 24. If node processor 72 and CCPU are communicating properly, a local block signal received from CCPU 24 inhibits node processor 72 from using the local control and protective actions from determining a set of breaker control actions. The breaker control actions are a set of signals that command circuit breaker 16 to operate in a predetermined manner. The presence of the local block signal indicates the communication state between node processor 72 and CCPU 24. If the local block signal is present in signals received from CCPU 24, Node processor uses CCPU 24 control and protective actions to determine breaker control actions. If the local block signal is not present, node processor 72 uses local control and protective actions to determine breaker control actions. Node processor 72 transmits breaker control action through actuation relay module 88, actuation power module 90, and the standard wiring harness.

Data received from A/D converter 78 and status input 86 by node processor 72 are transmitted to CCPU 24 via node electronics unit 20, and digital network 22. The data sent is to CCPU 24 is pre-processed data from node processor 72, in that, the data sent to CCPU 24 is sent in its raw form, before processing by node processor 72 takes place. The data transmitted to CCPU 24 via node electronics unit 20 is processed by CCPU 24, which transmits a signal to node electronics unit 20 via digital network 22. In the exemplary embodiment, node electronics unit 20 actuates circuit breaker 24 in response to the signal received from CCPU 24. In one embodiment, circuit breaker 24 is actuated in response to commands sent only by CCPU 24, i.e., circuit breaker 24 is not controlled locally, but rather is operated remotely from CCPU 24 based on inputs received from current transformer 82, potential transformer 84, and status inputs 86 received from node electronics unit 20 over network 22.

Figure 5:
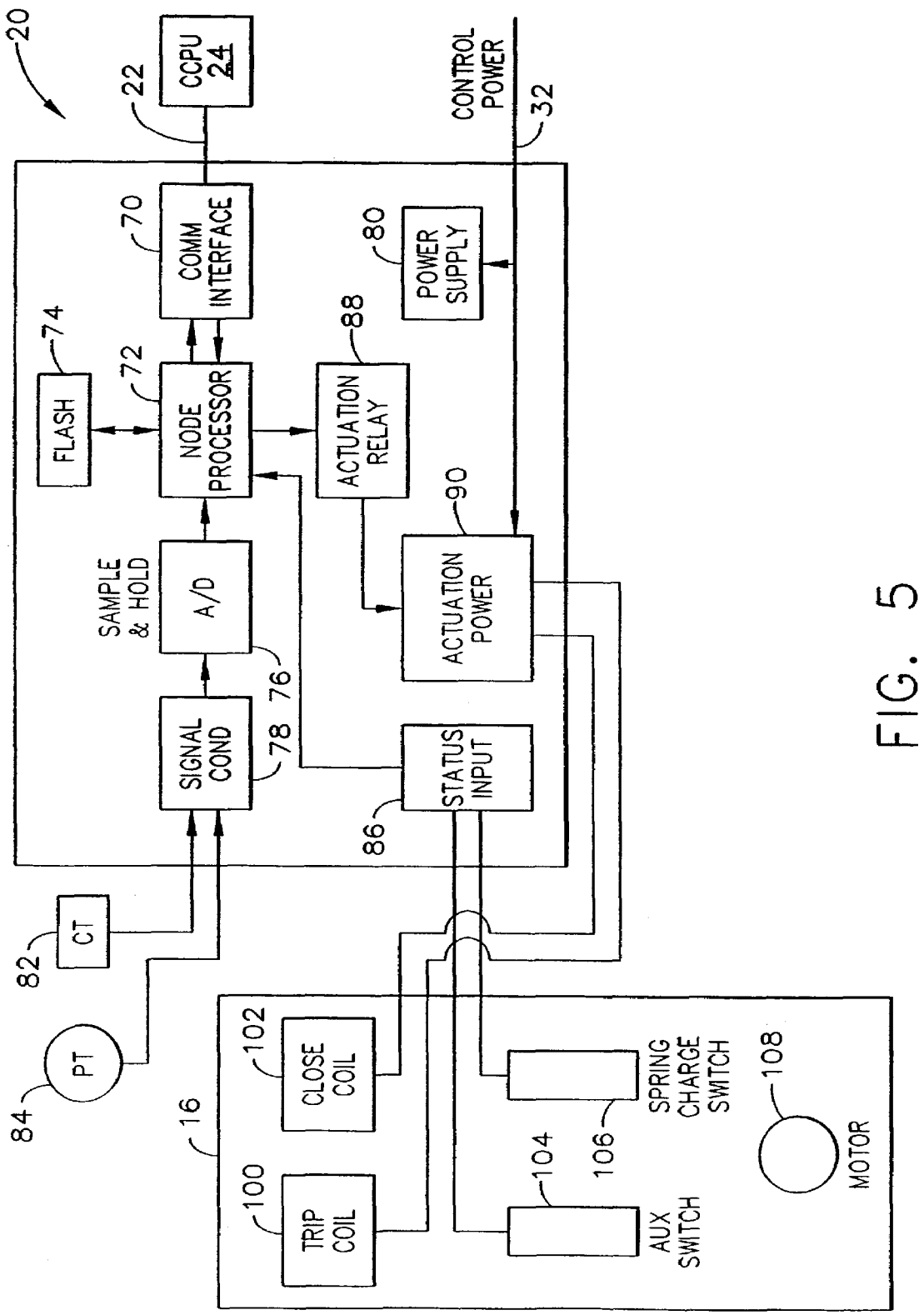
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 auxiliaries include only a trip coil 100, a close coil 102, an auxiliary switch 104, an operating spring charge switch 106, and a motor 108. Circuit breaker 16 does not include a trip unit. Auxiliary switches and sensors are coupled to node electronics unit 20 through a wiring harness, which may include both copper wiring and communications conduits. Current sensor 82, and voltage sensor 84 are coupled to node electronics unit 20 through a cable that may include copper wiring and/or communications conduits. Circuit breaker 16 is a unitary device mounted proximate to CCPU 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electro-mechanical device capable of recharging a trip spring. To close circuit breaker 16, a close coil 102 is energized by a close signal from actuation power module 90. Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
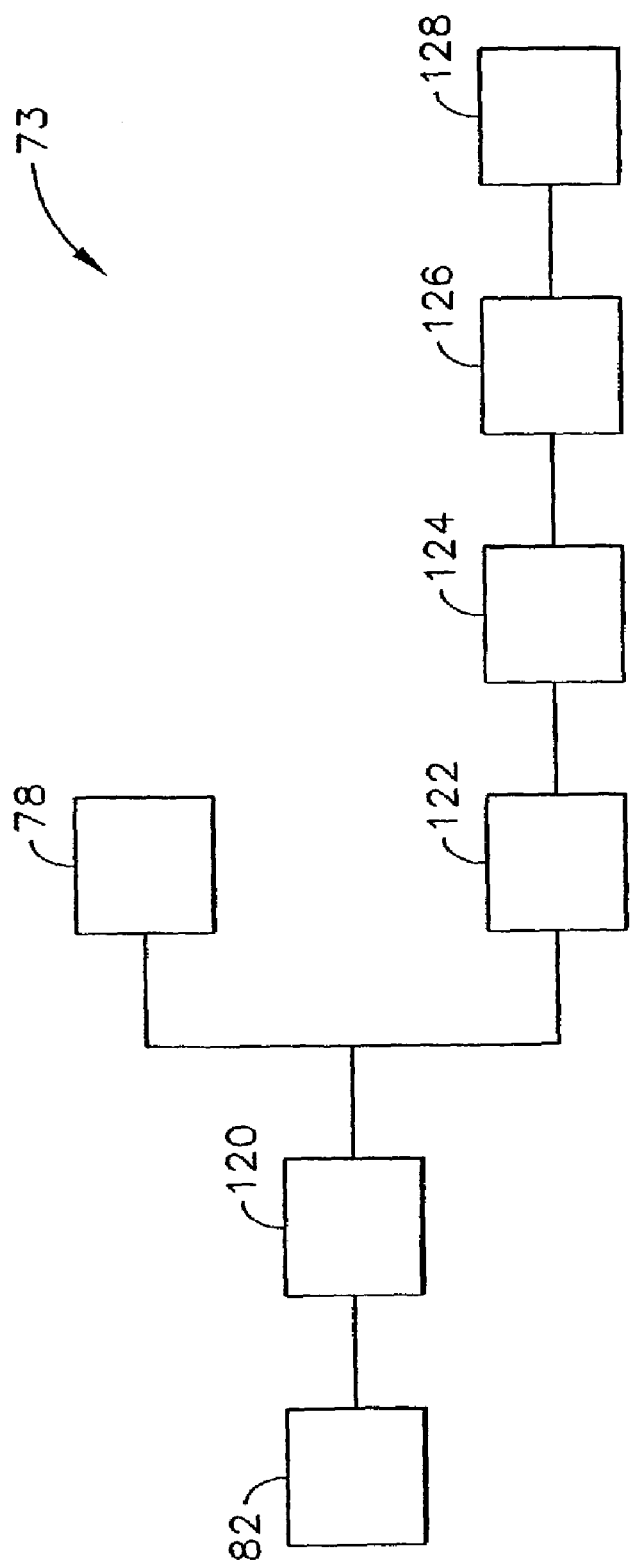
FIG. 6 is a schematic illustration of an exemplary self-power supply circuit that may be used with the node electronics unit shown in FIG. 4.

FIG. 6 is a schematic illustration of an exemplary self-power supply circuit 73 that may be used with node electronics units 20 shown in FIG. 4. CT 82 senses current flowing through each phase of the load current flowing through circuit breaker 16, and transmits the signal to CT 120. CT 120 transmits the current signal to the input of signal conditioner 78 and an input of a rectifier circuit 122 that converts the current signal to a direct current (DC)

power supply source. Rectifier circuit 122 is electrically coupled to energy storage circuit 124. In the exemplary embodiment, energy storage circuit 124 is a capacitor. Energy storage circuit 124 is electrically coupled to transistor switch 126. Transistor switch 126 operates to maintain a charge on energy storage circuit 124. In the exemplary embodiment, transistor switch is a field effect transistor (FET). Transistor switch 126 is electrically coupled to a voltage regulation circuit 128, which in turn is electrically coupled to an internal self-power supply power bus in node electronics units 20.

The above-described node electronics unit for a circuit breaker is cost effective and highly reliable. The node electronics unit includes a network communications interface for transmitting data and receiving commands from a CCPU, a processor to facilitate operating the circuit breaker based on commands received from the CCPU or from the processor when communications with the CCPU is lost, and input and output devices for sensing electrical system parameters and operating the circuit breaker. Therefore, the node electronics unit facilitates monitoring, controlling and protecting a power distribution system in a cost effective and reliable manner.

Exemplary embodiments of node electronics units are described above in detail. The node electronics units are not limited to the specific embodiments described herein, but rather, components of the node electronics unit may be utilized independently and separately from other components described herein. Each node electronics unit component can also be used in combination with other node electronics unit components.

While the invention has been described in terms of various specific embodiments, those skilled in the art will recognize that the invention can be practiced with modification within the spirit and scope of the claims.

What is claimed is:

1. A method of operating a power distribution system circuit, said method comprising:
monitoring electrical system parameters of a plurality of circuit breakers in the power distribution system, each circuit breaker of said plurality of circuit breakers being in electrical communication with a node electronics unit;
communicating said electrical system parameters from said node electronics unit to a central control processing unit;
determining circuit breaker actuation commands based at least partially on said electrical system parameters; and
communicating said circuit breaker actuation commands from said central control processing unit to said node electronics unit so that said node electronics unit operates each circuit breaker of said plurality of circuit breakers based on said circuit breaker actuation commands.

2. A method in accordance with claim 1 wherein said electrical system parameters are selected from the group consisting of: a load current, a voltage potential, a position of a circuit breaker auxiliary switch, and a status of a circuit breaker operating spring charge.

3. A method in accordance with claim 2 wherein said load current is monitored with a device located remote from each circuit breaker of the plurality of circuit breakers.

4. A method in accordance with claim 2 wherein said plurality of circuit breakers is a plurality of three phase circuit breakers.

5. A method in accordance with claim 2 wherein said voltage potential is monitored a device located remote from each circuit breaker of said plurality of circuit breakers.

6. A method in accordance with claim 1 wherein communicating said electrical system parameters and said circuit breaker actuation commands are communicated over a digital network.

7. A method in accordance with claim 6 wherein said digital network uses a Fast Ethernet protocol.

8. A method in accordance with claim 6 wherein said digital network has a data transfer rate of at least about 100 Mbps.

9. A method in accordance with claim 8 wherein said data transfer rate is about 1 Gbps.

10. A method in accordance with claim 1 wherein further comprises:
determining local circuit breaker commands and actions in said node electronics unit based on said electrical system parameters.

11. A method in accordance with claim 10 wherein said local circuit breaker commands and actions replaces said circuit breaker actuation commands when communications is lost between the node electronics unit and said central control processing unit.

12. A method in accordance with claim 10 further comprising resolving conflicts between said circuit breaker actuation commands and said local circuit breaker commands and actions.

13. A method in accordance with claim 11 further comprising transmitting said local circuit breaker commands and actions to each circuit breaker of said plurality of circuit breakers.

14. A method in accordance with claim 1 wherein said node electronics unit is powered from a control power supply circuit and includes at least one node processor that is configured to operate at a first clock speed, said method further comprises operating in a reduced power mode when the control power supply fails.

15. A method in accordance with claim 14 wherein said reduced power mode comprises operating with power supplied from a self-power supply circuit.

16. A method in accordance with claim 14 wherein said reduced power mode comprises operating the at least one node processors at a second clock speed, the second clock speed is slower than the first clock speed.

17. A node electronics unit comprising:
at least one network communications interface for communicating with the at least one central control processing unit;
at least one processor including a memory, a communication processor and a command interpreter, said at least one processor being coupled to said at least one network communications interface;
a signal conditioner module coupled to said processor, said signal conditioner for receiving electrical signals from a plurality of sensors adapted to be coupled to a circuit breaker, said plurality of sensors located remote from said node electronics unit;
a status input module coupled to said processor, said status input module for receiving status signals from said circuit breaker, said processor being configured to communicate said electrical signals and said status signals to said central control processing unit and being configured to receive circuit breaker actuation commands from said central control processing unit based on said electrical signals and/or said status signals; and an actuation power module coupled to said processor, said actuation power module for supplying said circuit breaker actuation commands to said circuit breaker.

18. A node electronics unit in accordance with claim 17 wherein said plurality of sensor comprises a circuit breaker load current sensor and a circuit breaker voltage sensor.

19. A node electronics unit in accordance with claim 17 wherein said at least one network communications interface is configured for Fast Ethernet network protocol.

20. A node electronics unit in accordance with claim 17 wherein said at least one processor is configured to determine when communications is lost between said node electronics unit and said central control processing unit.

21. A node electronics unit in accordance with claim 17 wherein said at least one processor is configured to determine said circuit breaker actuation commands and transmit said circuit breaker actuation commands to said circuit breaker.

22. A node electronics unit in accordance with claim 18 wherein said node electronics unit is powered from a control power supply circuit, and wherein said at least one processor comprises at least one self-powered processor.

23. A node electronics unit in accordance with claim 22 wherein said at least one self-powered processor is configured to operate said node electronics unit during a loss of said control power supply circuit.

24. A node electronics unit in accordance with claim 22 wherein said at least one self-powered processor comprises a self-power circuit electrically coupled to said circuit breaker load current sensor output.

25. A node electronics unit in accordance with claim 24, said self-power circuit comprising a rectifier circuit electrically coupled to an energy storage circuit, said energy storage circuit electrically coupled to a voltage regulation circuit for providing said self-powered processor with power.

26. A node electronics unit in accordance with claim 17 wherein said electrical signals from said plurality of sensors are analog signals representative of electrical system parameters associated with said circuit breaker.

27. A node electronics unit in accordance with claim 17 wherein said node electronics unit further comprises an analog/digital (A/D) converter, a digital/analog (D/A) converter, and an actuation relay.

28. A node electronics unit in accordance with claim 27 wherein said A/D converter comprises a sample and hold feature for synchronizing A/D converter output with a node processor synchronizing signal from said central control processing unit.

29. A power distribution system comprising:
a plurality of circuit breakers;
a node electronics unit in communication with each circuit breaker of said plurality of circuit breakers;
a digital network communicatively coupled to each said node electronics unit; and
at least one central control unit communicatively coupled to said digital network, said digital network communicating transmissions between each said node electronics unit and said at least one central control unit, said at least one central control unit operating any of said plurality of circuit breakers based on said transmissions.

30. A power distribution system in accordance with claim 29 wherein each said node electronics unit comprises a node processor, said node processor further comprises at least one of a command interpreter and a communication processor, said node processor electrically coupled to a memory unit that stores at least one of program instructions, program data, breaker time delay curves, and calibration constants.

31. A power distribution system in accordance with claim 30 wherein said memory unit comprises at least one of a random access memory (RAM), a flash memory (FLASH), a programmable read only memory (PROM), and an electronically erasable programmable read only memory (EEPROM).

32. A power distribution system in accordance with claim 30 wherein said node processor is further electrically coupled to a communications interface, said communications interface between said node processor and said network, said communications interface coupling said node processor to said digital network.

33. A power distribution system in accordance with claim 32 wherein said communications interface has a data transmission rate of at least about 100 Mbps.

34. A power distribution system in accordance with claim 30 wherein said node processor is further configured to receive digital input signals from an analog/digital converter (A/D) and to receive logical signals from a status input module, said node processor electrically coupled to said analog/digital converter (A/D) and said status input module.

35. A power distribution system in accordance with claim 34 wherein said analog/digital converter (A/D) is electrically coupled to a signal conditioner, said signal conditioned configured to receive analog signals from at least one electrical parameter sensor.

36. A power distribution system in accordance with claim 35 wherein said signal conditioner is configured to match an impedance of an input signal to an impedance of said analog input signals, said signal conditioner further configured to receive signals representative of at least one of three phase voltage, three phase current, and ground current.

37. A power distribution system in accordance with claim 34 wherein said analog/digital converter (A/D) is electrically coupled to a status input module, said status input module configured to receive status signals from said circuit breaker.

38. A power distribution system in accordance with claim 37 wherein said status signals comprise at least one of a position of at least one circuit breaker auxiliary switch, and a status of an circuit breaker operating spring charge.

39. A power distribution system in accordance with claim 30 wherein said node processor is further configured to transmit breaker command signals to said circuit breaker, said node processor electrically coupled to an actuation relay, said actuation relay electrically coupled to an actuation power module.

40. A power distribution system in accordance with claim 39 wherein said actuation relay is configured to energize at least one of a circuit breaker close coil, a circuit breaker trip coil, and a circuit breaker operating spring charge device.

41. A power distribution system in accordance with claim 29 wherein each said node electronics unit comprises a plurality of node processors, a first node processor configured to execute a first program code segment that controls at least one of communications functions, input functions, and output functions, a second node processor configured to execute a second program code segment that determines local control and protection actions, said second node processor powered from an electrical source onboard said node electronics unit.

* * * * *